United States Patent Office 3,316,243
Patented Apr. 25, 1967

3,316,243
PROCESS FOR CONVERTING 1-THIOGLYCOSIDES TO ANALOGS THEREOF
Brian Bannister, Kalamazoo, Robert D. Birkenmeyer, Comstock Township, Kalamazoo County, and Fred Kagan, Kalamazoo, Mich., assignors to The Upjohn Company, Kalamazoo, Mich., a corporation of Delaware
No Drawing. Filed Feb. 8, 1965, Ser. No. 431,185
9 Claims. (Cl. 260—210)

This invention relates to a process for converting 1-thioglycosides to analogs thereof by an interchange of thioaglycon moieties and is particularly directed to a process in which the starting 1-thioglycoside is converted to form the corresponding glycose and the glycose so formed is subjected to mercaptolysis with a thioaglycon different from the thioaglycon of the starting 1-thioglycoside to form a new 1-thioglycoside.

Some naturally-occurring or biosynthetically produced substances, notably lincomycin and celesticetin, have been shown to be 1-thioglycosides. No satisfactory method has been available heretofore for converting them to analogous 1-thioglycosides by an interchange of thioaglycon moieties. The methods heretofore available have either been complicated or have resulted in a Walden inversion whereby an α-1-thioglycoside is converted to a β-1-thioglycoside and vice-versa.

It has now been found that a conversion of 1-thioglycosides to analogs thereof by an interchange of thioaglycon moieties can be effected simply and economically without inversion by converting the starting 1-thioglycoside to the corresponding glycose and subjecting the glycose so formed to mercaptolysis with a thioaglycon different from the thioaglycon of the starting 1-thioglycoside.

The invention also relates to a novel process for converting 1-thioglycosides to the corresponding glycose, that is, to a novel process for the demercaptalation of a 1-thioglycoside. This novel demercaptalation is effected by treating the 1-thioglycoside with bromine in aqueous solution.

The mercaptolysis is effected by reacting the glycose with a mercaptan (thioaglycon) in the presence of an acid catalyst. The reaction advantageously is carried out in aqueous solution which is acidified with a strong acid, such as hydrochloric acid, sulfuric acid, phosphoric acid, p-toluene sulfonic acid, sulfonic acid type anion exchangers and like strong acids. The mercaptolysis is effected at a temperature that will minimize formation of acyclic dithioacetals. The particular temperature conditions used will depend upon the particular 1-thioglycoside used as the starting compound as it is known in the art that some configurations of sugars react more readily to form acyclic dithioacetals than others. Also, any acyclic dithioacetal formed can be recycled in the mercaptolysis and will tend to reduce the formation of acyclic dithioacetal. If desired, some or all of any acyclic dithioacetal formed can be recycled to the demercaptalation where it will be converted back to the glycose.

Advantageously the 1-thioglycoside is dissolved in water and the bromine added gradually with cooling to a temperature between about −10 and +20° C. It is sufficient if the solution is cooled to about 0° C. and the bromine added gradually thereto, for example, dropwise. The stoichiometric amount of bromine is one mole for each mole of starting compound, though more or less can be used. Advantageously, a slight excess, say from 5 to 20% excess of bromine is used. The resulting glycose can be isolated if desired but ordinarily this is neither necessary nor desirable as effective conversion is obtained by introducing a thioaglycon into the aqueous solution resulting from the bromination and treating the resulting system, which will ordinarily be a two phase system because of the insolubility of the thioaglycon, with hydrogen chloride gas or concentrated hydrochloric acid advantageously with cooling to a temperature between about −10 and +20° C. It is suitable if the reaction mixture is cooled to 0° C. and the hydrogen chloride gas bubbled in. It is advantageous, especially with the longer chain thioaglycons, to partially solubilize them by the addition of tetrahydrofuran to the reaction mixture. Advantageously from 15 to 20 parts of tetrahydrofuran for each part of water is used. The temperature of the reaction may be allowed to rise, advantageously not higher than about 55° C., during the addition of hydrogen chloride gas. After cooling to about 25° C., the tetrahydrofuran is removed under vacuum. The reaction mixture can be worked up in the usual way which may include solvent extraction at acid pH, solvent extraction at basic pH, liquid-liquid counter current extractions, such as, counter current distribution or partition chromatography, crystallization, and the like.

The processes of the invention are applicable to any 1-thioglycoside. As a practical matter, however, they are most useful with regard to naturally occurring or biosynthetically produced 1-thioglycosides. The processes of the invention have the advantage of being applicable to 1-thioglycosides containing free-hydroxyls, that is to say, the hydroxyl groups do not have to be protected by acylation. They have the advantage of producing new 1-thioglycosides having the thermodynamically more stable anomeric configuration. They can be applied to thioglycosides having other groups reactive with bromine but an aglycon analog of the starting 1-thioglycoside will not then be produced because of the modification of such other group. Nonetheless, a transfer from one aglycon moiety to another is effected, which is the fundamental object of the processes of the invention. It is desirable, however, that the starting thioglycoside be free of groups reactive with bromine or that when such a group is present that it be protected. For example, the amino group of amino 1-thioglycosides can be protected by acylation or by protonation; in other words, the amino groups is converted to a non-basic form. The processes of the invention are particularly applicable to the biosynthetically produced 1-thioglycosides, lincomycin and celesticetin, both of which have protected amino groups. Processes of the invention are particularly of advantage in this regard because although both celesticetin and lincomycin have basic amino groups other than the acylated amino group, this other amino group is tertiary and not reactive with bromine. A biosynthetically produced analog of lincomycin N-demethyllincomycin can be treated by the processes of the invention without effect on the amino group if the amino group is protonated; that is, if the N-demethyllincomycin is used in the form of an acid-addition salt, for example, the hydrochloride.

Lincomycin, methyl 6,8-dideoxy-6-(trans-1 - methyl - 4-propyl-L-2-pyrrolidinecarboxamido)-1-thio-D-*erythro* - α-D-*galacto*-octopyranoside, is a biosynthetic 1-thioglycoside obtained as an elaboration product of a lincomycin-producing actinomycete according to U.S. Patent 3,086,912. It has the following structural formula (R and $R_2$=methyl; $R_1$=propyl):

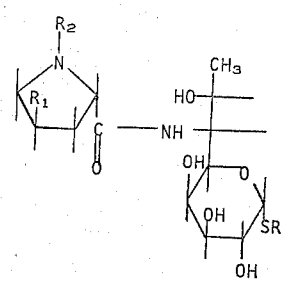

On treatment with hydrazine the free amino sugar, methyl 6-amino-6,8-dideoxy-D-erythro-1-thio-α-D-galacto-octano-pyranoside is obtained. When the fermentation is carried out in the presence of added amount of the free sugar, N-demethyllincomycin, methyl 6,8-dideoxy-6-(trans-4-propyl-L-2-pyrrolidinecarboxamido)-1-thio-D-erythro-α-D-galacto-octanopyranoside (R=methyl; $R_1$=propyl; $R_2$=hydrogen) is obtained. When the fermentations are carried out in the presence of added ethionine, the corresponding ethyl 1-thioglycosides are obtained.

Celesticetin, 2-salicyloyloxyethyl 6,8-dideoxy-7-O-methyl-6-(1-methylpyrrolidinecarboxamido)-1-thio-D-erythro-α-D-galacto-octanopyranoside, is a biosynthetic 1-thioglycoside obtained as an elaboration product of a celesticetin-producing actinomycete according to U.S. Patent 2,851,463. On hydrolysis according to U.S. Patent 2,928,844, desalicetin 2-hydroxyethyl 6,8-dideoxy-7-O-methyl-6-(1-methylpyrrolidinecarboxamido)-D-erythro-α-D-galacto-octanopyranoside is obtained. These compounds have the following structural formula:

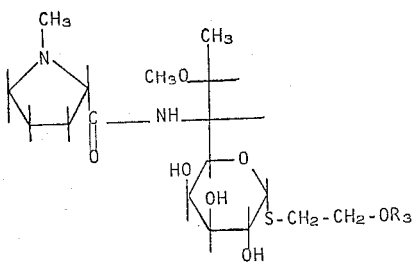

Celesticetin: $R_3$=salicyloyl
Desalicetin: $R_3$=H

On hydrazinolysis the free amino sugar, 2-hydroxyethyl 6-amino-6,8-dideoxy-7-O-methyl-1-thio-D-erythro-α-D-galacto-octanopyranoside is obtained.

The free amino sugar moieties can be N-acylated with other acyl groups by methods well known in the art for the acylation of amino sugars. The compounds can also be O-acylated if desired but as already pointed out this is unnecessary in the novel processes of the invention.

Any of the above biosynthetic-produced 6-acylamino 1-thio-octanopyranosides can be converted to 1-thio analogs by aglycon moiety exchange according to the processes of the invention which may be more fully understood by reference to the following sequence:

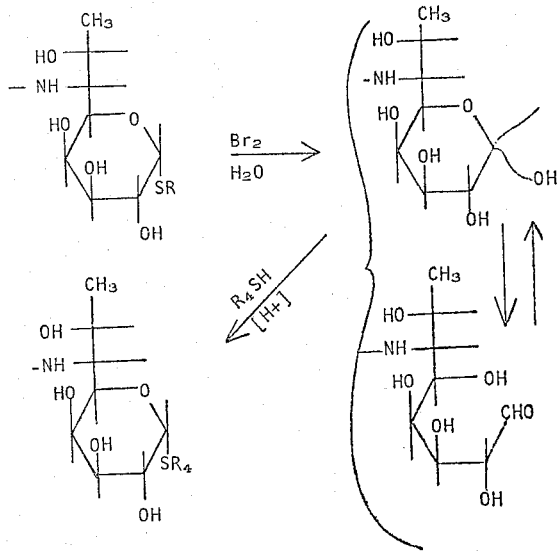

The resulting 6-acylamino compounds are antibacterials having the same antibacterial spectrum as lincomycin and celesticetin, respectively, and some of them, particularly the ones where $R_4$ is lower alkyl or lower cycloalkyl, i.e., alkyl or cycloalkyl of not more than 8 carbon atoms, for example, propyl, butyl, pentyl and cyclohexyl, have generally the same or superior antibacterial activity. The deacylated sugars can also be converted by the above sequence, if the amino group is neutralized, to the corresponding 1-thio analogs which when N-acylated with 1-methyl-4-propylpyrrolidinecarboxylic acid, 1-methylpyrrolidinecarboxylic acid and like pyrrolidinecarboxylic acids yield N-acyl 1-thioglycosides which have antibacterial activity like that of lincomycin.

As the pyrrolidine nitrogen is a basic nitrogen, the compounds can exist in the protonated or non-protonated form according to the pH of the environment. The same is true with the free sugar since the 6-amino group is basic. On acidification with the appropriate acid they form stable acid-addition salts. Those which are readily water soluble, for example, the hydrochloride, sulfate, phosphate and the like can be used effectively in the processes of the invention. These salts not only dissolve readily in water but also protect basic amino groups from attack by the bromine. The basic 1-thioglycosides specifically illustrated above therefore can be dissolved in water as a water-soluble, acid-addition salt, treated with bromine and the glycose thus obtained subjected to acid-catalyzed mercaptolysis to form the desired new basic 1-thioaglycon. The reaction mixture then can be extracted with suitable solvents at the acid pH of the reaction mixture and further extracted at an alkaline pH at which the compound exists primarily in the free base form, advantageously at a pH of 10 to 12, and then fractionated by partition chromatography.

The invention may be more fully understood by reference to the following examples which are given by way of illustration only. The parts and percentages are by weight unless otherwise specified. The solvent ratios are volume to volume unless otherwise specified.

EXAMPLE 1

Conversion of lincomycin to S-ethyl-S-demethyllincomycin

Lincomycin hydrochloride (8.85 g.—0.02 mole) was dissolved in 20 ml. of water, cooled at 0° and stirred while adding bromine (3.52 g.—0.022 mole) dropwise over a 1-minute period. Ethanethiol (25 ml.) was added and the mixture stirred at 25° for 2 hours. The clear, colorless, 2-phase system (ethanethiol is relatively insoluble in water) was cooled in an ice bath and hydrogen chloride gas bubbled in for about 5 minutes. The lower, aqueous phase turned red. The reaction mixture was then extracted 3 times with 100 ml. portions of Skellysolve B (technical hexane) and aqueous sodium hydroxide solution added to bring the aqueous phase to pH 11. The basic phase was extracted well with chloroform. The chloroform extracts were washed with saturated sodium chloride solution, dried, and evaporated under vacuum to yield 6.2 g. of a white solid. Of this solid, 4.8 g. was chromatographed over silica gel. The 4.8 g. of white solid was adsorbed on 15 g. of silica gel in methylene chloride, dried and sifted onto a 2½-inch diameter column of 800 g. of silica gel. The column was then eluted with a mixture of methanol and chloroform in the proportions of 1 to 7. After 800 ml. of forerun, eighty 25 ml. fractions were collected. Fractions 40 through 58 were combined, evaporated to dryness, and the residue recrystallized from acetone. About 0.5 g. of 6,8-dideoxy-6-(trans-1-methyl-4-propyl-L-2-pyyrrolidinecarboxamido)-D-erythro-D-galacto-aldehydoactose diethyl dithioacetal of the following formula:

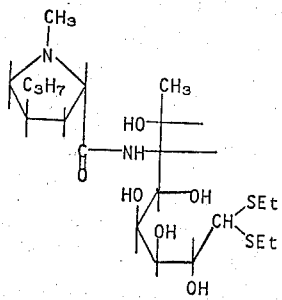

was obtained.

Analysis.—Calcd. for $C_2H_{42}N_2O_6S_2$: C, 52.25; H, 8.77; N, 5.80; S, 13.29. Found: C, 52.16; H, 8.77; N, 5.84; S, 13.30.

Fractions 65 through 75 were combined, evaporated to dryness, and the residue converted to the hydrochloride salt and recrystallized from aqueous acetone to yield about 0.5 g. of the S-ethyl analog of lincomycin, ethyl 6,8-dideoxy - 6 - (trans-1-methyl - 4 - propyl-L-2-pyrrolidinecarboxamido)-D - erythro - α - D - galacto - octopyranoside.

Analysis.—Calcd. for $C_{19}H_{37}ClN_2O_6S$: C, 49.93; H, 8.16; Cl, 7.76; N, 6.13; S, 7.01. Found: C, 49.53; H, 8.23; Cl, 7.39; N, 6.04; S, 6.88

$[\alpha]_D^{25} + 147°$ (c=1.1206 in $H_2O$)

This product had an antibacterial activity about 2 times lincomycin and was identical with that prepared by carrying out the fermentation according to U.S. Patent 3,086,912 in the presence of added ethionine.

EXAMPLE 2

Conversion of lincomycin to S-isopropyl-S-demethyl-lincomycin

Lincomycin hydrochloride (35.4 g.—0.08 mole) was dissolved in 80 ml. of water, cooled at 0° C. and stirred while adding bromine (14.08 g.—0.088 mole) dropwise over a 5-minute period. 2-propanethiol (80 ml.) and 1400 ml. of tetrahydrofuran were added and hydrogen chloride gas bubbled in vigorously until the temperature of the reaction rose to 43° C. At this temperature the two phase system became homogeneous. Hydrogen chloride gas addition was stopped and the reaction solution stirred without external heating or cooling for two hours. The tetrahydrofuran was distilled under vacuum and after the aqueous residue was worked up as described in Example 1, the S-isopropyl analog of lincomycin was obtained. This compound exhibited about the same antibacterial activity as lincomycin, and the following elemental analysis:

Analysis.—Calcd. for $C_{20}H_{39}ClN_2O_6S$: C, 50.99; H, 8.35; N, 5.95; S, 6.81; Cl, 7.53. Found: C, 51.23; H, 8.39; N, 5.92; S, 7.02; Cl, 7.58.

$[\alpha]_D^{25} + 137°$ (c=0.6798 in $H_2O$)

EXAMPLE 3

Following the procedure of Example 2 substituting the ethanethiol by butanethiol, the S-butyl analog of lincomycin is obtained. This product had an antibacterial activity of about 2 times that of lincomycin and the following elemental analysis:

Analysis.—Calcd. for $C_{21}H_{41}ClN_2O_6S$: C, 51.99; H, 8.52; N, 5.78; S, 6.61. Found: C, 50.64; H, 8.33; N, 5.68; S, 6.41.

$[\alpha]_D^{25} + 130°$ (c=0.4070 in $H_2O$)

EXAMPLE 4

Following the procedure of Example 2 substituting the ethanethiol by cyclohexanethiol, the S-cyclohexyl analog of lincomycin is obtained. This compound had an antibacterial activity about 2 times that of lincomycin and the following elemental analysis:

Analysis.—Calcd. for $C_{23}H_{43}ClN_2O_6S$: C, 54.04; H, 8.48; N, 5.48; S, 6.27; Cl, 6.94. Found: C, 53.57; H, 8.74; N, 5.37; S, 6.25; Cl, 6.66.

$[\alpha]_D^{25} + 123°$ (c=0.9952 in $H_2O$)

By substituting the mercaptans of Examples 1, 2, 3, and 4 by other alkyl mercaptans, for example, propyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl mercaptans and the isomeric forms thereof and like alkyl mercaptans containing not more than 20 carbon atoms; by other cycloalkyl mercaptans, for example, cyclopropyl, cyclobutyl, cyclopentyl, cycloheptyl, cyclooctyl, 2-methylcyclopentyl, 2,3-dimethylcyclobutyl, 2-methylcyclobutyl, and 3-cyclopentylpropyl mercaptans and like cycloalkyl mercaptans containing from 3 to not more than 8 carbon atoms; or by aralkyl mercaptans, for example, benzyl, phenethyl, 3-phenylpropyl, and 1-naphthylmethyl mercaptans and like aralkyl mercaptans containing not more than 12 carbon atoms, the corresponding alkyl, cycloalkyl, and aralkyl 6,8-dideoxy-6-(trans-1-methyl-4-propyl-L-2-pyrrolidinecarboxamido) - D - erythro - α-D-galacto-octopyranosides are obtained.

On hydrazinolysis, or on applying the above procedural steps to the free sugar hydrochloride, the corresponding alkyl, cycloalkyl, and aralkyl 6-amino-6,8 - dideoxy-D-erythro-α-D-galacto-octopyranosides are obtained.

We claim:

1. A process for converting 1-thioglycosides to 1-thio analogs thereof by the interchange of thioaglycon moieties which comprises reacting the starting 1-thioglycoside in aqueous solution with bromine to produce an aqueous solution of the corresponding glycose, adding a mercaptan different from the aglycon of the starting 1-thioglycoside and acidifying the solution with a strong acid to catalyze mercaptolysis.

2. A process for converting 1-thioglycosides to the corresponding glycose which comprises reacting the 1-thioglycoside with bromine in the presence of water at a temperature between about —10 and +20° C.

3. The process which comprises brominating in aqueous solution a compound of the formula

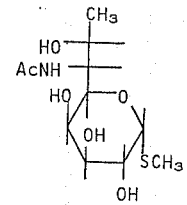

where Ac is an acyl group non-reactive with bromine, adding a mercaptan of the formula $R_4SH$ where $R_4$ is a member of the group consisting of alkyl of 2 to not more than 20 carbon atoms, cycloalkyl of not more than 8 carbon atoms, and aralkyl of not more than 12 carbon atoms and an acid mercaptolysis catalyst and recovering from the solution a compound of the formula

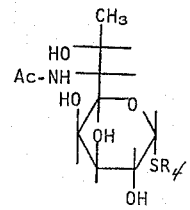

where $R_4$ and Ac are as given above.

4. The process of claim 3 in which Ac is 1-methyl-4-propyl-L-2-pyrrolidinecarbonyl.

5. A process for the mercaptolysis of glycoses with mercaptans which comprises incorporating the glycose and the mercaptan in an aqueous medium containing tetrahydrofuran in the proportion of from about 15 to 20 parts of tetrahydrofuran for each part of water and adding hydrochloric acid thereto while not permitting the temperature to rise above about 55° C.

6. The process which comprises contacting a glycose of the formula

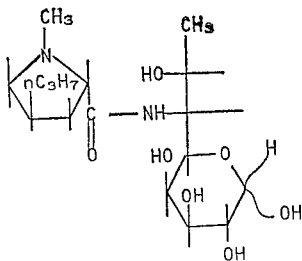

in aqueous solution with a mercaptan and a strong acid at a reactive temperature below about 55° C. and recovering the formed 1-thioglycoside.

7. The process of claim 6 in which the mercaptan has for formula $R_4$—SH where $R_4$ is a member of the group consisting of alkyl of 2 to not more than 20 carbon atoms, cycloalkyl of not more than 8 carbon atoms and aralkyl of not more than 12 carbon atoms and recovering a 1-thioglycoside having the formula

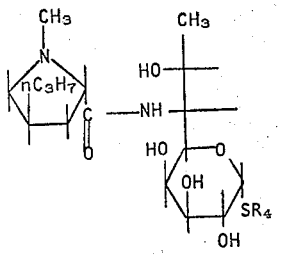

where $R_4$ is as given above.

8. The process of claim 6 in which the reaction medium includes about 15 to 20 parts of tetrahydrofuran for each part of water.

9. The process of claim 7 in which the reaction medium includes about 15 to 20 parts of tetrahydrofuran for each part of water.

References Cited by the Examiner

UNITED STATES PATENTS 2,851,463  9/1958  Hinman et al. _____ 260—210

OTHER REFERENCES

Pigman, "The Carbohydrates," 1957, Academic Press, New York, N.Y., pp. 201, 226 and 383.

ELBERT L. ROBERTS, *Primary Examiner.*

LEWIS GOTTS, *Examiner.*

JOHNNIE R. BROWN, *Assistant Examiner.*